Patented Apr. 13, 1937

2,076,889

UNITED STATES PATENT OFFICE 2,076,889

PRODUCTS OBTAINABLE FROM HIGH MOLECULAR CARBOHYDRATES AND PROCESS OF PREPARING THEM

Emil Hees, Wiesbaden, Germany, assignor to Winthrop Chemical Company, Inc., New York, N. Y., a corporation of New York No Drawing. Application November 6, 1934, Serial No. 751,789. In Germany November 15, 1932

14 Claims. (Cl. 167—65)

The present invention relates to products obtainable from high molecular carbohydrates and to a process of preparing them.

In the past every treatment of disease aimed at removing the excitant of the disease, remedying the damage done to the living substance and restoring the normal conditions in the organism.

In the treatment of vaginal discharge, for instance, one has hitherto tried to attain these aims by various methods. The decomposed secretion was mechanically removed by rinsing or like means or the disease was treated by disinfection, astringency of the wall of the vagina, absorption or creation of the normal degree of acidity or lactic acid bacteria were directly introduced. Recently, lactose or similar nutritive substances have been used to cause bacterial growth in the vagina. However, in the case of all these methods failures often occurred. A complete success could not be attained by the use of these methods, because the normal biological conditions had not been observed or had been only partly considered.

By investigations and observations carried out for many years I have found that the frequent failure—particularly as regards a permanent success—when employing said methods is due to the fact that the chief cause of chronic vaginal discharge has not been considered and, therefore, the construction of a causal therapy has been neglected. The chronic vaginal discharge is chiefly caused by the lack of glycogen and its degradation products in the vagina or by the complete or partial failure of this degradation process by which unstable hexoses, the so-called alloiomorphous hexoses or h-hexoses are formed which by the action of lactic acid bacteria are decomposed into lactic acid.

This disturbance of the normal biological conditions of the vagina caused by the illness can be overcome and the natural function of the vagina can be re-established by using substances that resemble glycogen and are in partially degraded condition as a remedy for vaginal discharge. I have found that suitable substances resembling glycogen can be prepared from high molecular carbohydrates by subjecting them to the action of hydrogen peroxide. The treatment is preferably carried out at temperatures between about 10° C. to 50° C. in a neutral aqueous medium. The hydrogen peroxide is used in such an amount that at least one part of hydrogen peroxide (calculated upon the anhydrous substance) is used for about 200 parts of the carbohydrate, preferably in an amount of 0.5 per cent to 10 per cent of the weight of the carbohydrate. As high molecular carbohydrates there may preferably be used starch or products containing starch, for instance, flours of all kinds, such as wheat flour, rye flour, rice flour, soya bean flour, millet flour; furthermore polysaccharides, such as inuline, glycogen, pectine, dextrine, lichenine, or partial decomposition products of polysaccharides, obtainable, for instance, by causing special bacteria to act upon polysaccharides. The reaction is promoted by the addition of catalytically acting substances, such as arsenic and phosphates. The catalytic effect may be increased by using a catalyst, such as platinum or pyrolusite, the catalysts remaining in completely unattacked condition during this process.

The reactions set in soon after the various substances have been mixed, the granules of the flour being burst and amylose as well as a large portion of amylopectine being set free. In this manner the quantity of the amylopectine which will enter into the reaction is increased on the one hand and on the other hand more phosphoric acid is liberated from the amylopectine, which phosphoric acid catalyses the desired phosphorylating process of the starch.

As the result of many experiments I have found the following process to be the most suitable. A high molecular carbohydrate, such as starch, e. g. ordinary wheat flour, and hydrogen peroxide in one of the usual concentrations are mixed so that, for instance, about 0.5 to 10 parts of anhydrous hydrogen peroxide are contained in 100 parts of the flour. After some time the reaction begins. It may be promoted at any stage by the addition of the afore-named catalysts and contact substances. The mixture must have a neutral reaction, because too large a degradation would occur in an acid or alkaline reaction. The reaction itself lasts for about 3 to 4 days and then spontaneously ceases, the temperature being suitably kept between 20° C. and 50° C. The product thus obtained is subjected to a drying process. I have determined by protracted investigations that the increase of the lactic acid bacteria and the unavoidable resumption of the degradation of sugar to form lactic acid in the organism is due to this stage of the appearance and degradation of the hexose-di-phosphoric acid ester and the labile forms of the alloiomorphous hexose with which is connected the specificity of the ferments that degrade the sugar in the organism.

Fundamental differences were noticed during these investigations, not only in comparison with former methods of treating vaginal discharge, but also with investigations into the use of non-treated starch and commercially stable hexose, for instance, stable fructose, glucose and similar substances. Whereas in the latter case there comes foremost the increase of coli bacteria, wild yeasts together with continuance of acetic fermentation and other anomalous kinds of fermentation noxious to the mucous membranes of the patient, the continuous use of the pretreated starch causes a suppression of the mixed flora, strongly excites the growth of lactic acid bacteria and simultaneously stops the acetic fermentation and other anomalous kinds of fermentation, while the lactic acid fermentation is promoted.

The preparation described is therapeutically used in the form of tablets, globules or powder. In cases of non-specific vaginal discharge, i. e. a discharge in which pathogenic bacteria are not present, the above described products may be used, without adding any other specific substances. In cases, however, of a specific vaginal discharge, i. e. a discharge caused by specific excitants, such as trichomonadae, gonococci or spirochaetae the preparations described above are suitably combined with specifically acting substances, such as 4-hydroxy-3-acetylaminobenzene-1-arsonic acid or other remedies containing arsenic, furthermore boric acid or gonocidal agents. In these cases the action of the specific remedy, which often is not capable of removing the excitants when applied alone, is successfully assisted by the generally favorable action of the decomposition products of high molecular carbohydrates. Both these decomposition products and the specific combating agents must be present in order to obtain a cure.

The following examples illustrate the invention, but they are not intended to limit it thereto:

(1) 15 kilograms of wheat flour are stirred for 3 days at room temperature together with 25 liters of hydrogen peroxide of 3 per cent strength. 11 kilograms of wheat flour are then added, the mixture is stirred until it becomes homogeneous and is then thinly spread on plates. The product thus treated is dried at a temperature of 40° C. to 50° C. under reduced pressure and after it has been completely dried, it is ground in a suitable mill so as to form a fine powder. The product thus obtained is a greyish to whitish mass almost insoluble in water.

(2) 600 grams of inuline are well stirred with 1 liter of a hydrogen peroxide solution of 3 per cent strength. After a standing of 24 hours at room temperature the mass obtained is dried at 40° C. to 50° C. in the vacuum and then triturated to a fine powder.

This application is a continuation-in-part of my U. S. application Serial No. 698,221, filed November 15, 1933.

I claim:

1. The process which comprises causing hydrogen peroxide to act in a neutral aqueous medium upon a starch-containing material in an amount of 0.5 per cent to 10 per cent of the weight of the starch-containing material.

2. The process which comprises causing hydrogen peroxide to act in a neutral aqueous medium upon a flour in an amount of 0.5 per cent to 10 per cent of the weight of the flour.

3. The process which comprises causing hydrogen peroxide to act in a neutral aqueous medium upon a flour in an amount of 0.5 per cent to 10 per cent of the weight of the flour at a temperature between about 10° C. and 50° C.

4. The process which comprises causing hydrogen peroxide to act in a neutral aqueous medium upon wheat flour in an amount of 0.5 per cent to 10 per cent of the weight of the wheat flour at a temperature between about 10° C. and 50° C.

5. The process which comprises causing hydrogen peroxide to act in a neutral aqueous medium upon rice flour in an amount of 0.5 per cent to 10 per cent of the weight of the rice flour at a temperature between about 10° C. and 50° C.

6. The process which comprises causing hydrogen peroxide to act in a neutral aqueous medium upon soya bean flour in an amount of 0.5 per cent to 10 per cent of the weight of the soya bean flour at a temperature between about 10° C. and 50° C.

7. The product obtainable by causing hydrogen peroxide to act in a neutral aqueous medium upon a starch-containing material in an amount of 0.5 per cent to 10 per cent of the weight of the starch-containing material, said product being a greyish to whitish mass almost insoluble in water.

8. The product obtainable by causing hydrogen peroxide to act in a neutral aqueous medium upon a flour in an amount of 0.5 per cent to 10 per cent of the weight of the flour, said product being a greyish to whitish mass almost insoluble in water.

9. The product obtainable by causing hydrogen peroxide to act in a neutral aqueous medium upon a flour in an amount of 0.5 per cent to 10 per cent of the weight of the flour at a temperature between about 10° C. and 50° C., said product being a greyish to whitish mass almost insoluble in water.

10. The product obtainable by causing hydrogen peroxide to act in a neutral aqueous medium upon wheat flour in an amount of 0.5 per cent to 10 per cent of the weight of the wheat flour at a temperature between about 10° C. and 50° C., said product being a greyish to whitish mass almost insoluble in water.

11. The product obtainable by causing hydrogen peroxide to act in a neutral aqueous medium upon rice flour in an amount of 0.5 per cent to 10 per cent of the weight of the rice flour at a temperature between about 10° C. and 50° C., said product being a greyish to whitish mass almost insoluble in water.

12. The product obtainable by causing hydrogen peroxide to act in a neutral aqueous medium upon soya bean flour in an amount of 0.5 per cent to 10 per cent of the weight of the soya bean flour at a temperature between about 10° C. and 50° C., said product being a greyish to whitish mass almost insoluble in water.

13. A composition of matter comprising 4-hydroxy-3-acetylaminobenzene-1-arsonic acid and the product obtainable by causing hydrogen peroxide to act in a neutral aqueous medium upon wheat flour in an amount of 0.5 per cent to 10 per cent of the wheat flour.

14. A composition of matter comprising a gonocidal substance and the product obtainable by causing hydrogen peroxide to act in a neutral aqueous medium upon wheat flour in an amount of 0.5 per cent to 10 per cent of the weight of the wheat flour.

EMIL HEES.